F. McGREGORY.
AUTOMOBILE SIGNAL.
APPLICATION FILED MAY 1, 1914.

1,126,807.

Patented Feb. 2, 1915.

F. McGregory, Inventor

Witnesses by Attorneys

UNITED STATES PATENT OFFICE.

FRED McGREGORY, OF DECATUR, ILLINOIS.

AUTOMOBILE-SIGNAL.

1,126,807.	Specification of Letters Patent.	Patented Feb. 2, 1915.

Application filed May 1, 1914. Serial No. 835,743.

*To all whom it may concern:*

Be it known that I, FRED McGREGORY, a citizen of the United States, residing at Decatur, in the county of Macon and State of Illinois, have invented a new and useful Automobile-Signal, of which the following is a specification.

The present invention appertains to a visual traffic signal for automobiles or motor vehicles, and aims to provide a novel and improved contrivance of that nature.

The present invention contemplates the provision of a signal mechanism including a visual signal disposable at the rear end of the machine, in combination with actuating means extended to the chauffeur's or operator's seat, whereby the signal may be conveniently and properly manipulated.

It is also within the scope of the present invention to provide an appliance of the character specified, which will be improved generally in its construction, so as to enhance the utility of the device.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention has been illustrated in its preferred embodiment in the accompanying drawings, wherein:—

Figure 1:
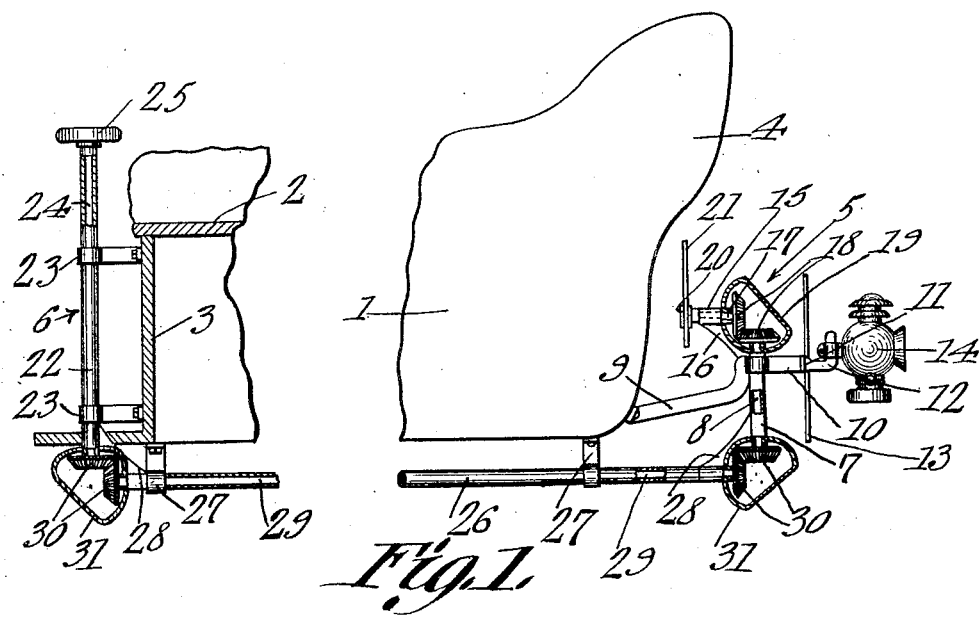
Figure 2:
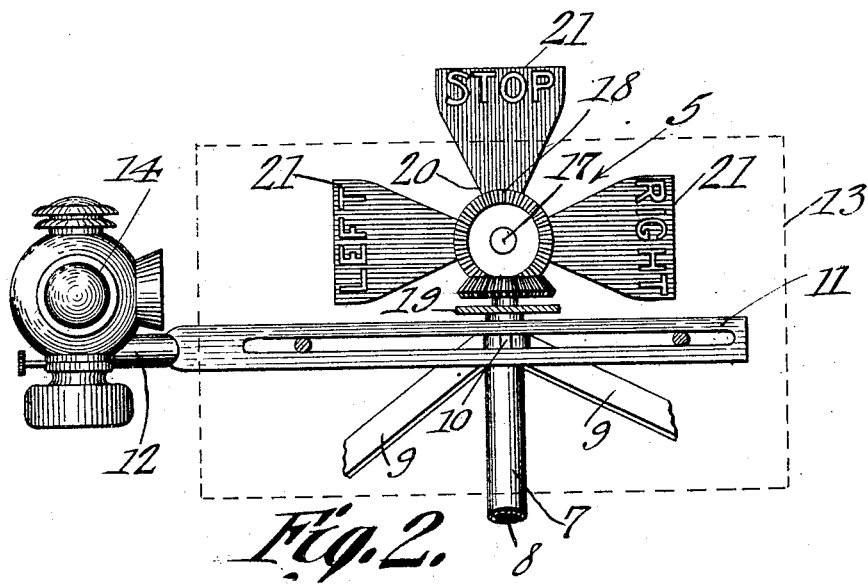

Figure 1 is a fragmental side elevation, somewhat diagrammatical, of an automobile body illustrating the present mechanism applied thereto, parts being shown in section. Fig. 2 is an enlarged fragmental rear view of the signal device proper.

In the drawing, the numeral 1 designates an arbitrary or conventional automobile or motor vehicle body including the front or chauffeur's seat 2, having the heel board 3. The automobile or body 1 also includes the rear seat 4, although it is to be understood, at the outset, that the present contrivance is applicable to various types or styles of motor vehicles with equal propriety and success.

The present mechanism includes a signal device 5 disposed at the rear end of the automobile body 1, and a controlling means 6 operatively connected thereto, and extending to the front or operator's seat 2.

The signal device 5 includes an upright tubular standard or housing 7 through which is journaled a shaft 8, the standard or housing 7 being attached to the rear end of the body 1, or to any other suitable portion of the machine, by diverging braces or brackets 9.

The rear ends of the rearwardly projecting braces 9, or those portions thereof, which are attached to the standard or tubular portion 7, are provided with an arm or shank 10 projecting rearwardly from the standard, and to which arm is secured a transversely disposed slotted bracket or carrier 11 having a rearwardly offset lamp bracket 12 at one end. The license panel or plate 13 is bolted or otherwise adjustably engaged to the slotted portion of the carrier 11, and the usual tail lamp 14 is mounted upon the lamp bracket 12, so as to illuminate the rear or exposed face or side of the license panel 13, during darkness or the night season.

The signal device 5 further includes a horizontal bearing 15 disposed in advance of and projecting forwardly from the axis of the standard 7 and shaft 8, and connected to the upper end portion of the standard or tubular portion 7 by means of a brace 16. A shaft or spindle 17 is journaled through the tubular member 15, the adjacent ends of the shafts 8 and 17 being operatively connected by intermeshing beveled gears 18 keyed or secured to the said ends of the shafts. It is preferable to house or inclose the gears 18 by means of a suitable case or housing 19 secured to the adjacent ends of the tubular members 7 and 15. The case 19 may serve as a grease or lubricant container, as well as protecting the gears from dust and other foreign matter.

The signal 20 is attached to the forward or free end of the shaft or spindle 17 in front of the bearing 15 and comprises a plurality of radial arms or vanes 21. As illustrated, three vanes or wings 21 are employed, the same being disposed at right angles relative to each other, and being marked "Left," "Stop" and "Right." The rear or exposed sides of the vanes or wings 21 may be suitably colored, and the vanes or arms 21 are arranged to be swung above the plane of the upper edge of the license panel 13 which projects above the axis of the shaft 17 to expose the respective vanes or arms 21 when the shaft 17 is rotated, and to enable the vanes to be readily seen from the rear. The tail lamp 14 will also serve to illuminate the exposed or upstanding rear signal arm 21, as will be apparent.

Coming to the controlling device 6, the same includes a forward tubular standard or post 22, which is preferably disposed directly in advance of the heel board 3 of the front seat, and which is secured to the said heel board by a pair of brackets 23 attached to the heel board and embracing the standard 22.

A shaft 24 is journaled through the standard 22 and has attached to its upper end, a suitable hand wheel 25, which is disposed adjacent the front seat 2, to be readily manipulated by the chauffeur or operator.

The lower end of the shaft 24 is operatively connected to the lower end of the rear shaft, and to this end, a longitudinal tubular housing 26 is disposed below the bottom of the body 1, and is preferably carried by the bottom of the body, through the medium of brackets or hangers 27 secured to the body 1 and embracing the tubular member or housing 26. The end portions of the tubular housing 26 are preferably attached to the lower ends of the tubular standards 7 and 22, by means of braces or brackets 28 to render the structure rigid.

A longitudinal shaft 29 is journaled through the tubular housing 26, and the ends of the shaft 29 and the lower ends of the shafts 8 and 24 are operatively connected, by means of intermeshing beveled gears 30 secured to the said ends of the shafts. The gears 30 are preferably housed or inclosed by cases or housings 31 attached to the adjacent ends of the tubular members 26, 7 and 22. The cases or housings 31 have the same functions as the case or housing 19 above disclosed. In this connection, it is to be observed that the tubular members 7, 15, 22 and 26 inclose the shafts, while the gears or shaft connections are protected by the housings 31. Thus, the actuating mechanism is protected from dust and other extraneous matter.

The present apparatus may be constructed in various sizes and proportions, according to the circumstances and may be readily applied to various automobile bodies. After the contrivance has been installed upon a motor vehicle, the signal 20 may be readily oscillated or rotated by turning or oscillating the hand wheel 25, which may be conveniently accomplished by the operator. Through the medium of the present apparatus, the operator may indicate to persons or vehicles in the rear, his intentions to turn to the right or left, or to stop, in order that the following vehicle or vehicles may be governed accordingly. Thus, when the operator wishes to turn to the right or left, the hand wheel 25 is rotated to bring either the "left" or "right" vane or signal arm uppermost so as to be exposed to the rear above the license panel 13. When the operator desires to stop the machine, the "stop" vane or arm 21 is swung upright or uppermost, so as to be exposed to view from the rear.

It is evident that when the hand wheel 25 is rotated, the rotary movement will be transmitted by means of the operatively connected shafts 24, 27, 29, 8 and 17 to the signal 20, to the ends above noted. It is also to be noted that the signal 20 rotates about a horizontal or longitudinal axis, in front of the license panel 13 whereby the vanes or arms 21 of the signal may be successively swung into view over the upper edge of the license panel. When it is desired to swing all of the vanes or arms 21 out of view, the same may readily be accomplished by swinging the signal 20 in such a position that the "stop" arm 21 is lowermost or in a depending position.

The present device is entirely mechanical, relying on no electrical connections or devices which are more or less uncertain in their effectiveness. The present visual traffic signal, by warning the vehicular traffic in rear of the machine, of the intensions of the operator, increases the safety of the vehicular traffic and tends to reduce accidents to a minimum.

Having thus described the invention, what I claim as new is:—

In a signal mechanism, a rearwardly projecting bracket attachable to the rear end of a motor vehicle, an upright tubular standard carried by the bracket, an arm carried by the said bracket and projecting rearwardly from the said standard, a license panel carried by the said arm, a horizontal forwardly projecting bearing, a brace connecting the said bearing and standard, horizontal and upright shafts journaled through the said bearing and standard, respectively, and operatively connected with each other at their adjacent ends, a signal carried by the horizontal shaft in front of the bearing, the panel projecting above the axis of the horizontal shaft, the signal having separate signal portions each adapted to swing above the panel, and actuating means operatively connected to the lower end of the upright shaft.

In testimony that I claim the foregoing as my own, I have hereto affixed my signature in the presence of two witnesses.

FRED McGREGORY.

Witnesses:
 S. T. CLANTON, Jr.,
 L. E. DUNCAN.